(12) United States Patent
Doshi

(10) Patent No.: US 7,399,352 B2
(45) Date of Patent: Jul. 15, 2008

(54) COATING COMPOSITION

(75) Inventor: Jyotindra K. Doshi, North Olmsted, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 299 days.

(21) Appl. No.: 10/741,617

(22) Filed: Dec. 19, 2003

(65) Prior Publication Data

US 2004/0210022 A1     Oct. 21, 2004

Related U.S. Application Data

(60) Provisional application No. 60/435,840, filed on Dec. 20, 2002.

(51) Int. Cl.
*C09D 183/04* (2006.01)

(52) U.S. Cl. .................. 106/287.16; 106/287.17; 106/287.19; 106/286.4; 106/286.6; 106/287.21; 528/25; 528/27; 528/31; 528/34

(58) Field of Classification Search ............ None
See application file for complete search history.

(56) References Cited

U.S. PATENT DOCUMENTS

| 3,926,896 A | 12/1975 | Dumoulin |
| 4,042,749 A | 8/1977 | Sandvig |
| 4,069,368 A | 1/1978 | Deyak et al. |
| 4,073,967 A | 2/1978 | Sandvig |
| 4,151,344 A | 4/1979 | Doss et al. |
| 4,271,215 A | 6/1981 | Coon |
| 4,318,939 A | 3/1982 | Wong |
| 4,501,872 A | 2/1985 | Chang et al. |
| 4,585,705 A | 4/1986 | Broderick et al. |
| 4,681,811 A | 7/1987 | Simpson et al. |
| 4,788,106 A | 11/1988 | Short |
| 4,808,483 A | 2/1989 | Nakasuji et al. ............ 428/447 |
| 4,871,806 A | 10/1989 | Shalati et al. |
| 4,975,488 A | 12/1990 | Furukawa et al. |
| 4,999,442 A | 3/1991 | Sato et al. |
| 5,039,385 A | 8/1991 | Tominaga |
| 5,064,688 A | 11/1991 | Trifon |
| 5,069,767 A | 12/1991 | Tominaga |
| 5,162,426 A | 11/1992 | Hazan et al. |
| 5,252,654 A | 10/1993 | David et al. |
| 5,292,799 A | 3/1994 | Naito et al. |
| 5,981,648 A | 11/1999 | Lucas et al. |
| 6,475,329 B1 | 11/2002 | Johnson et al. |
| 6,569,980 B1 | 5/2003 | Masaoka et al. ............. 528/27 |
| 6,703,442 B1 * | 3/2004 | Ando et al. ................. 524/588 |
| 2002/0010273 A1 | 1/2002 | Matsumura et al. |

OTHER PUBLICATIONS

International Search Report for PCT/US2003/040819, 3 pages PCT Written Opinon dated Oct. 19, 2004, International Application No. PCT/US03/40819, International Filing Date Dec. 19, 2003, corresponding to U.S. Appl. No. 10/741,617.

* cited by examiner

*Primary Examiner*—Marc S Zimmer
(74) *Attorney, Agent, or Firm*—Vivien Y. Tsang; Robert E. McDonald

(57) ABSTRACT

A coating composition comprising a reaction product of the following components:
(a) at least one cyclic ether or anhydride; and
(b) an alkoxysilane-functional polyacrylate, alkyd, polyester, epoxy, or a multifunctional polyol; and
(c) at least one metal ester having the general formula $R_m\text{-}M(OR')_n$, in which M is Si, Al, Zr, or Ti, Mg, B, W, or Mo, R is a hydrocarbon group of less than 10 carbon atoms or a group comprising hydrogen, carbon and oxygen of less than 20 carbon atoms, R' is an alkyl or aryl group with less than 10 carbon atoms, m has values of 0, 1, 2 an 3 and correspondingly n is 4, 3, 2, or 1; and
(d) at least one organofunctional alkoxysilane.

13 Claims, No Drawings

COATING COMPOSITION

CROSS-REFERENCE TO RELATED APPLICATION

This application claims the benefit of U.S. provisional patent application No. 60/435,840 filed on Dec. 20, 2002, the entirety of which is hereby incorporated by reference.

BACKGROUND

The present invention relates to new and improved formaldehyde and isocyanate-free room temperature, low temperature, heat and IR radiation curable compositions for use as coatings for wood, metal, plastics, ceramic, concrete, and other substrates. The coatings can be used, for example, for kitchen cabinets, automobiles, appliances, wood flooring, and several other applications.

It is well known that exposure to formaldehyde and isocyanate has significant health hazard issues. For example, under a court order OSHA has established long term (8 hours) and short term (15 minutes) PELs (permissible exposure limits) for formaldehyde. The rules require that any company marketing products that release free formaldehyde must label the containers and provide an MSDS showing how much formaldehyde is present. As formaldehyde has been declared a carcinogen, it is regulated as such. Isocyanate-containing coatings, on the other hand, require special breathing equipment for use to avoid respiratory system problems.

In the coatings industry, formaldehyde-containing polymers are commonly used as "crosslinking" resins that react with carboxyl or hydroxyl functional polymers such as polyesters or alkyd resins. Most of the current industrial finishes that require baking use coatings that contain some free formaldehyde. During the spraying process, workers can be exposed to some unsafe levels of free formaldehyde that comes from the paint. The coatings are then baked at temperatures >275° F. forming fully-crosslinked film. After the baking process, there is no longer any significant emission of free formaldehyde.

In the particular case of the wood finishing industry, it is not possible to bake the finishes at high temperature, and therefore a high level of acid catalyst is used to facilitate the crosslinking at room temperature. This type of coating is commonly termed a "conversion varnish". Typically, a conversion varnish creates a two stage release of free formaldehyde; namely, in the first stage, free formaldehyde is released from the coating itself during spraying and in a second stage, formaldehyde is released during the curing process. This second stage can last for several weeks. Many of these types of coatings are used by manufacturers in finishing kitchen cabinets, and for other indoor wood finishes.

Thus, it would be desirable to eliminate emission of free formaldehyde without compromising performance. In spite of the concerns, the performance and cost effectiveness of these types of coatings make it difficult to replace them. As regulations continue to be more stringent, it is anticipated that elimination of formaldehyde emission will become mandatory.

Additionally, numerous high performance, high solids coating compositions are based upon polymeric systems comprised of either polyester-based or polyacrylic-based polyols and crosslinking agents therefor. These coatings are generally supplied as "one-pack" or "two-pack" systems. In a typical one-pack system, all of the coating ingredients are combined into one storage stable mixture. In a typical two-pack system, a crosslinking agent is combined shortly before application with curing being conducted at ambient or elevated temperatures. Generally, two-pack systems have the advantages of corrosion and humidity resistance, short dry times and tough film thickness. However, two-pack systems utilizing isocyanate crosslinkers or strong acid based crosslinkers have a number of disadvantages; for example, these two-pack systems require special handling and storage operations to avoid human exposure to the toxic isocyanates and acids. Further, the components of two-pack systems can only be mixed shortly prior to use. One-pack systems known in the art typically utilize resins which are susceptible to hydrolysis, which compromise the quality of the coating. Thus, it would be desirable to provide a one-pack, high solids, isocyanate-free system that has the desirable properties of the two-pack systems.

Accordingly, it is an object of the present invention to provide room temperature or low temperature curable compositions which exhibit high performance characteristics such as corrosion and humidity resistance, tough film properties, and no formaldehyde evolution upon curing. It is another object of this invention to provide coating compositions comprising these room temperature or low temperature curable compositions. The compositions of this invention can be cured effectively at lower temperatures without the use of toxic crosslinking agents, and do not liberate formaldehyde on curing. It is also an object of this invention to provide a one-pack, high solids, isocyanate-free system that has the desirable properties of a two-pack isocyanate system.

SUMMARY OF THE INVENTION

The coating composition of the present invention comprises a reaction product of the following components:
(a) at least one cyclic ether or anhydride; and
(b) an alkoxysilane-functional polyacrylate, alkyd, polyester, epoxy, or a
multifunctional polyol; and
(c) at least one metal ester having the general formula Rm-M(OR')n, in which M is Si, Al, Zr, or Ti, Mg, B, W, or Mo, R is a hydrocarbon group of less than 10 carbon atoms or a group comprising hydrogen, carbon and oxygen of less than 20 carbon atoms, R' is an alkyl or aryl group with less than 10 carbon atoms, m has values of 0, 1, 2 an 3 and correspondingly n is 4, 3, 2, or 1; and
(d) at least one organofunctional alkoxysilane.

The coating composition can further comprise the reaction product of a multifunctional polyol and (1) an isocyanate-functional silane; (2) a multifunctional orthosilicate; and/or (3) a metallic alkoxide. The coating composition can further comprise a hydroxy-functional polymer and/or a silicate such as tetraethyl orthosilicate, and/or an alkyd polymer.

DESCRIPTION OF THE INVENTION

In accordance with the present invention, new and improved curable compositions are provided, said compositions comprising at least one at least one cyclic ether or anhydride, an alkoxysilane-functional polyacrylate, alkyd, polyester, epoxy, or a multifunctional polyol; and at least one metal ester having the general formula Rm-M(OR')n, in which M is Si, Al, Zr, Ti, Mg, B, W or Mo; Rm is a hydrocarbon group of less than 10 carbon atoms or a group comprising hydrogen, carbon and oxygen of less than 20 carbon atoms, R' is an alkyl or aryl group of less than 10 carbon atoms, m has values of 0, 1, 2 an 3 and correspondingly n is 4, 3, 2, or 1; and at least one organofunctional alkoxysilane.

The cyclic ether useful for this invention can be a cycloaliphatic epoxide or cycloaliphatic diepoxide, multifunctional glycidyl epoxide, multifunctional glycidyl diepoxide, epoxidized oils or polymers containing an oxirane ring. In a preferred embodiment, the cyclic ether is a cycloaliphatic diepoxide, and can be described by the general formula:

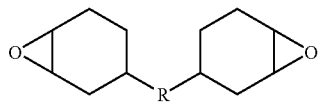

Where R=—CH$_2$—O—C(O)—C$_4$H$_8$—C(O)—O—CH$_2$—; —C(O)—O—CH$_2$—

Other cyclic ethers or cycloaliphatic epoxides useful for this invention can be 3,4-epoxycyclohexylmethyl 3,4-epoxycyclohexyl carboxylate and bis-(3,4-epoxycyclohexylmethyl) adipate (commercially available as ERL-4221 and ERL-4299, respectively, from Dow Chemical Company), various glycidyl ethers such as diglycidyl ether, butyl glycidyl ether, bis-A-epoxy resins, and the like.

The alkoxysilane-functional polyacrylate is represented by the formula:

wherein R1 is an organic acrylic polymer, R2 is a divalent organic radical, and R3 is a monovalent radical that can include heteroatoms (e.g., oxygen, nitrogen, sulfur), including but not limited to, alkyl (linear or branched), cycloalkyl, aryl, allyl, or aralkyl. The silicon alkoxide functionality pendant in the acrylic polymer can be available for further crosslinking.

The alkoxysilane-functional polyacrylate can be prepared by methods known in the art. Preferably, the alkoxysilane-functional polyacrylates are made utilizing alkoxysilanes represented by the general formula:

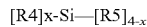

In the above formula, R4 is an ethylenically unsaturated organic moiety and R5 is an alkoxy or an acetoxy group; and x is a positive integer from 1 to 3.

Alternatively, multifunctional polyols such as a reactive silanated polyol can be utilized, such as the TONE® polyol or any other hydroxyl functional polymers such as polyesters, alkyds, and hydroxy functional epoxies.

The metal esters which have been found useful in the practice of the invention may be represented by the formula R$_m$-M(OR')$_n$, in which M is silicon, aluminum, zirconium, titanium, magnesium, boron, tungsten, or molybdenum; R$_m$ is a hydrocarbon group of less than 10 carbon atoms or a group comprising hydrogen, carbon and oxygen of less than 20 carbon atoms, R' is an alkyl or aryl group of less than 10 carbon atoms, m has values of 0, 1, 2 an 3 and correspondingly n is 4, 3, 2, or 1. Representative metal esters that can be used in the practice of this invention include tetra-isopropyl titanate (commercially available as Tyzor® TPT, DuPont), tetra-n-butyl titanate (commercially available as Tyzor® TBT, DuPont), tetraethyl titanate, tetra-2-ethylhexyl titanate, tetra-n-butyl zirconate, tetra-n-butyl titanate, aluminum isopropoxide, aluminum n-butoxide, aluminum s-butoxide, orthosilicate, tetraethylorthosilicate and tetraisopropyl zirconate. Other useful metal esters of the type described are known in the art. The preferred metal esters are tetraisopropyl titanate, tetraisobutyl titanate, tetraisopropyl zirconate, and tetraisobutyl zirconate.

Organofunctional alkoxysilanes that have been found useful in the practice of the present invention include beta-(3,4-epoxycyclohexyl)ethyltrimethoxysilane (SILQUEST A 186), gamma-glycidoxypropyltrimethoxysilane (SILQUEST A-187 or Z 6040); vinyltriethoxysilane (SILQUEST A151); vinyl-tris-(2-methoxyethoxy) silane (SILQUEST A 172); gamma-methacryloxypropyltrimethoxy silane (SILQUEST A174); methyltriethoxysilane (SILQUEST A-162); methyltrimethoxysilane (SILQUEST A-1630); gamma-isocyanatopropyltriethoxysilane (SILQUEST A1310); and vinyltriacetoxy silane. (All of the above SILQUEST compounds are commercially available from OSI Specialties, Inc., Danbury, Conn.). Other useful organofunctional alkoxysilanes such as glycidyl epoxy, cycloaliphatic epoxy, methyl, methacrylato propoyl, vinyl, mercapto, isocyanato and amino functional silanes, and others known to the art, can be used. It has been found that the further addition of an isocyanatosilane modified polyol can improve pencil hardness and abrasion resistance of the coating.

The coating composition can further comprise the reaction product of a multifunctional polyol and (1) an isocyanate-functional silane; (2) a multifunctional orthosilicate; and/or (3) a metallic alkoxide.

While not intending to be bound by any theory, it is believed that the improvement in film formation and drying takes place when the metal ester reacts with atmospheric moisture and goes through hydrolysis to form a metal network. For example, titanium isopropoxide reacts with atmospheric moisture and goes through hydrolysis and condensation reactions to form a titania network. The mechanism by which this occurs could be a combination of the silane and tetraorthoethyl silicate, wherein the silane and the ortho silicate hydrolyze to form a crosslinked network of the silica and titania. Also, use of a cycloapliphatic epoxy provides improvement in the hardness and chemical resistance through a crosslinking between the titanium oxide and the epoxy ring as well as with alkoxy silane functionality. According to this invention, use of the cycloaliphatic epoxysilane is beneficial for coatings for wood floors used by manufacturers of wood flooring, and for automotive topcoats.

The coating compositions used in the practice of this invention are prepared by simply admixing or blending the cyclic ether such as cycloaliphatic (di)epoxide (or multifunctional glycidyl (di)epoxide); the alkoxysilane-functional polyacrylate, alkyd, polyester, epoxy, or multifunctional polyol; the metal ester crosslinker; and the organofunctional alkoxysilane at room temperature (i.e., 25 C). Other additives such as leveling agents, colorants, viscosity modifiers, etc. may also be included in the composition by simple mixing. The preferred order of addition of the ingredients is to add the cycloaliphatic (di)epoxide to the reactive organofunctional alkoxysilane, and then the metal ester is added slowly at the end under constant agitation.

The coating composition of this invention can comprise 1-50% by weight of the alkoxysilane-functional polyacrylate (or alkyd, polyester, epoxy, or multifunctional polyol), 1-50% by weight of the cyclic ether (e.g., cycloaliphatic (di)epoxide or multifunctional glycidyl (di)epoxide), 1-70% by weight of the organofunctional alkoxysilane, and 1-40% by weight of the metal ester.

The coating composition of this invention can further comprise 1 to 50 weight percent of one or more of the following: (1) a hydroxy-functional polymer; (2) a silicate such as tetraethyl orthosilicate; (3) a silicone hydride functional polymer such as polyhydridomethylsiloxane; (4) an alkyd polymer; (5) a compounds having primary, secondary, or tertiary amine functionality; (6) a compound having alpha,beta unsaturated polymers; and/or (7) the reaction product of a multifunctional polyol and (a) an isocyanate-functional silane, (b) multifunctional orthosilicate, or (c) metallic alkoxide.

In one embodiment of this invention, a silicate such as tetraethyl orthosilicate is added to the coating composition to provide improved hardness properties. The silicate can be added to the composition with constant mixing. Preferably, the silicate is present at between 1.0 weight percent and 20 weight percent, based on the total weight of the coating composition.

In another embodiment of this invention, the composition of this invention can be used with a variety of oils, polyether polyols, alkyds, amines, polyesters, cycloaliphatic epoxides, glycidyl epoxides, silanes, acrylics, silicon alkoxides, isocyanate functional silanes, glycol ethers, polypropylene, polyethylene, polyvinyl chloride, polyvinyl acetates, and any other hydroxy functional polymers to produce coatings having much improved chemical resistance, corrosion resistance, hardness and drying properties.

In the case of wood floors and automotive topcoats, it has also been found that the addition of a reaction product of an isocyanate-functional silane and a multifunctional polyol is also desirable. For example, an isocyanate-functional silane such as Silquest A-1310 is reacted with a multifunctional polyol such as Tone® 0301 polyol to provide a silane-functional urethane. The silane-functional urethane is then added to the coating composition to promote further crosslinking between the silane groups. If present, the silane-functional urethane is added in an amount of between 1.0 weight percent and 20 weight percent, based on the total weight percent of the final coating composition.

Typically, after admixing or blending, the coating composition can be applied directly to the substrate. The coatings of the present invention may be applied to any substrate in any desired thickness to impart abrasion resistance, solvent resistance, and corrosion resistance. Applications of the coatings of this invention include stains, floor finish topcoats, sanding sealers, conversion varnish for kitchen cabinets, automotive topcoat, epoxy primers, and flattening agents.

EXAMPLES

Example 1

Preparation of a Polyacrylate

A polyacrylate of this invention can be made by mixing the following components at 160° C.:

| Component | |
|---|---|
| Styrene | 50 parts |
| Butyl acrylate | 30 parts |
| Hydroxy Propyl Methacrylate | 50 parts |
| Butyl Acetate | 100 parts |
| Vazo 67 | 1 part |

Example 2

Preparation of a Silanated Polyacrylate

The following coating composition was prepared utilizing the polyacrylate of Example 1:

| Component | Weight Percent |
|---|---|
| Propylene glycol | 3.8 |
| n-butyl acetate | 48.0 |
| Example 1 Acrylic | 31.6 |
| Silquest A-186 | 1.0 |
| EPON 815 | 16.0 |
| Byk 370 | 0.7 |
| Titanium n-butoxide | 10 |

The resulting coating composition is coated onto a surface of wood by spray technique (standard kitchen cabinet oak) and cured at ambient temperature. This one-pack coating was analyzed under the KCMA specifications (KCMA-A 161.1-2000) with the following results, as compared to a commercially available two-pack acid-catalyzed alkyd urea system:

| | Example 2 One-pack | Comm. Available Two-pack |
|---|---|---|
| Dry to touch | 15 mins. | 15 mins |
| 1 hr @ 120° F. | Stackable | Stackable |
| Chemical resistance | PASS | PASS |
| Edge soak test (24 hr immersion) | PASS | PASS |
| Cold Check (5 cycles) | PASS | PASS |
| Heat resistance (24 hrs @ 120° F.) | PASS | PASS |

Example 3

Preparation of a Silanated Polyol

A multifunctional polyol, and in particular, a silanated polyol, is made by mixing together the following:

| Component | |
|---|---|
| Caprolactone-based polyester polyol (TONE ® 0301 polyol) | 100 grams |
| Isocyanate-functional silane (A-1310) | 30 grams |
| Dibutyl tin dilaurate | 0.1 gram |

The above mixture is heated for 1 hr. @ 230° F. and is monitored using FTIR until all of the isocyanate is reacted.

Example 4

Preparation of a Coating Composition

A coating composition utilizing the silanated polyol of Example 3 is prepared as follows:

| Component | Weight Percent |
| --- | --- |
| Silanated polyol of Example 3 | 20.7 |
| 1,3-di(3,4-epoxycyclohexyl)-2-propanone(ERL4221) | 11.5 |
| SILQUEST A-186 | 47.6 |
| Titanium n-butoxide | 20.0 |

The above components are added under constant mixing. The resulting coating composition is coated onto a surface of a metal at 2.9 mil film thickness, and cured at ambient temperature. The resulting coating has a pencil hardness of H, gloss of 129 at 60 degrees, table abrasion after 2200 cycles, CS17 wheels, 1000 gram weight of 0.1813 gram loss.

Example 5

Preparation of a Silanated Acrylic Resin

A silanated acrylic resin can be prepared as follows:

In a flask, 220.0 grams of butyl acetate and 0.5 grams of Vazo-52 initiator (available from Du Pont is blended. The temperature is raised to 115° C., and the following blend is added over a two hour period while stirring and increasing the temperature to 128 C:

| Component | Weight Percent |
| --- | --- |
| Butyl Acrylate | 106 grams |
| Styrene | 276 grams |
| Silquest A-174 | 43 grams |

After the above components are added, 0.5 grams of dodecyl mercaptan is added. After a total of 3.5 hours since the initial blend, 2.0 grams of Vazo-52 are added and after an additional 1 hour at 128° C., butyl acetate is added. The mixture is heated until the monomer conversion is complete.

Example 6

Preparation of a Coating Composition

The following coating composition was prepared utilizing the silanated acrylic in Example 5

| Component | Weight Percent |
| --- | --- |
| n-Butyl Acetate | 28.0 |
| Butyl Propasol | 5.0 |
| Example 5 Silanated acrylic | 54.0 |
| Silquest A-186 | 1.0 |
| Silane 1-1630 | 2.5 |
| Byk 370 | 0.7 |
| Wacker's Tes-28 | 5.0 |
| Zirconium n-butoxide | 5.0 |

Example 7

Preparation of a Sealer for Untreated Wood

| Component | Weight Percent |
| --- | --- |
| Silrez SY-409 (comm. avail. from Wacker) | 16.67 |
| Tes-28 (comm. avail. from Wacker) | 16.67 |
| Aluminum-s-Butoxide | 16.67 |
| Odorless mineral Sprit | 50.00 |

The resulting coating composition is coated onto a surface of oak wood by spray or brush application and cured at ambient temperature. The coating can be sanded within 1 hr.

Examples 8-13 were prepared as coating compositions at differing gloss finishes, such as satin, gloss, high gloss. The components were blended together at room temperature.

Example 8

| Component | Weight Percent |
| --- | --- |
| Butyl Propasol | 64.8 |
| Silane A-162 | 49.4 |
| Silanated Polyol of Example 3 | 1.01 |
| Silquest A-186 | 26.49 |
| ERL-4221 | 17.65 |
| Zirconium n-butoxide | 20.00 |

Example 9

| Component | Weight Percent |
| --- | --- |
| Butyl Propasol | 44.08 |
| Silane A-162 | 5.10 |
| Silanated Polyol of Example 3 | 10.42 |
| SILQUEST A-186 | 16.41 |
| ERL-4221 | 10.93 |
| Titanium n-Butoxide | 13.08 |

Example 10

| Component | Weight Percent |
| --- | --- |
| Silanated Polyol of Example 3 | 16.8 |
| ERL-4221 | 16.47 |
| Butyl Propasol | 17.29 |
| Silane A-162 | 2.94 |
| TS-100 (Fumed Amorphous Silica) | 2.30 |
| Wacker TES-28 | 1.62 |
| Silquest A-186 | 22.55 |
| Zirconium N-butoxide | 20.00 |

Example 11

| Component | Weight Percent |
| --- | --- |
| Silanated Polyol of Example 3 | 17.53 |
| ERL-4221 | 16.36 |
| Butyl Propasol | 14.34 |
| Silane A-162 | 3.50 |
| TS-100 (Fumed Amorphous Silica) | 1.46 |
| Wacker TES-28 | 23.36 |
| Silquest A-186 | 20.45 |
| Zirconium N-butoxide | 20.00 |

Example 12

Polymer Formulation for High Gloss

| Component | Weight Percent |
| --- | --- |
| Tone ® Polyol 0301 | 5.58 |
| ERL-4299 (Bakelite resin) | 20.10 |
| Silquest A-186 Silane | 60.32 |
| Tetra Orthosilicate | 11.76 |
| Cab-O-Sil TS 610 fumed silica | 2.23 |

Example 13

Polymer Formulation for Satin Finish

| Component | Weight Percent |
| --- | --- |
| Tone ® Polyol 0301 | 5.28 |
| ERL-4299 (Bakelite resin) | 19.00 |
| Silquest A-186 Silane | 57.02 |
| Tetra Orthosilicate | 6.02 |
| Cab-O-Sil TS 610 fumed silica | 2.11 |

Example 14

Crosslinker Formulation

| Component | Weight Percent |
| --- | --- |
| Coatosil 1770 Modified Epoxysilane | 33.75 |
| Zirconium N-Butoxide (AKZ-945) | 33.12 |
| Tyzor ® Tetrabutyl Titanate | 33.12 |

Example 15

Coating Formulation

| Component | Weight Percent |
| --- | --- |
| High Gloss Polymer of Example 11 | 71.45 |
| Polymer of Example 13 | 28.55 |

Example 16

Coating Formulation

| Component | Weight Percent |
| --- | --- |
| Satin Polymer of Example 12 | 71.45 |
| Polymer of Example 13 | 28.55 |

Samples from the above examples were tested for physical and chemical properties, with the following results:

|  | Comm. Avail. 2K Urethane | Comm. Avail. 2K Waterborne | Comm. Avail. Oil Modified Urethane | Ex. 4 | Ex. 8 | Ex. 9 | Ex. 10 | Ex. 11 |
| --- | --- | --- | --- | --- | --- | --- | --- | --- |
|  | Satin | Satin | Gloss | Gloss | Gloss | Gloss | Semi-Gloss | Semi-Gloss |
|  | 2K W/B | 2K W/B | 1K-Solv | 1K-solv | 1K-solv | 1K-solv | 1K-solv | 1K-solv |
|  | Ureth. | Aziridine | Alkyd-Urethane | Alkoxy-Si | Alkoxy-Si | Alkoxy-Si | Alkoxy-Si | Alkoxy-Si |
| NVM % | 35.19 | 36.96 | 46.21 | 78.25 | 75.67 | 71.62 | 74.63 | 68.84 |
| DFT | | | | | | | | |
| 30-Bar | 0.67 | 0.55 | 0.73 |  | 0.89 | 0.91 | 0.86 | 1 |
| 60-Bar | 1.17 | 1.318 | 1.32 |  | 2.02 | 2.1 | 1.96 | 1.91 |
| 90-Bar | 1.73 | 1.72 | 1.66 | 4.633 | 2.51 | 2.33 | 2.73 | 2.62 |
| GLOSS | | | | | | | | |
| 30-Bar | 15.4 | 20.1 | 130 |  | 129 | 132 | 65.2 | 46 |
| 60-Bar | 16.1 |  | 131 |  | 127 | 131 | 68.8 | 42.9 |
| 90-Bar | 16.8 | 40.2 | 132 | 129 | 127 | 129 | 69.6 | 67.9 |

-continued

|  | Comm. Avail. 2K Urethane | Comm. Avail. 2K Waterborne | Comm. Avail. Oil Modified Urethane | Ex. 4 | Ex. 8 | Ex. 9 | Ex. 10 | Ex. 11 |
|---|---|---|---|---|---|---|---|---|
| PENCIL HARDNESS | | | | | | | | |
| 30-Bar | 4H | H-2H | B-HB |  | HB-F | 3H-4H | H | H |
| 60-Bar | 4H | H-2H | <6B |  | B | 2H-3H | 2H-3H | 2H-3H |
| 90-Bar | 2H | H-2H | <6B | H | B | 2H-3H | H | 2H-3H |
| Adhesion | 5B |  | 5B | 5B | 5B | 5B | 5B | 5B |
| TABER | 31.5 |  | 150.1 |  | 152.7 | 108.8 | 105.9 | 71.4 |
| WEAR-90 | 1600/2000 | 600/800 | 200/400 | 2200 | 600/800 | 800/1000 | 2000/2200 | 2400/2600 |

The above examples are offered to illustrate the present invention. Various cyclic ethers, alkoxysilanes, silanated acrylics, and metal alkoxides may be used in a wide range of proportions and concentrations, and cured using different temperatures and cycles. Any pigments, fillers and other additives compatible with the composition of the present invention may be employed in any amount.

The invention claimed is:

1. A coating composition comprising the reaction product of the following components:
    (a) at least one cycloaliphatic diepoxide; and
    (b) a polyacrylate, alkyd, polyester, epoxy or multifunctional polyol having alkoxysilane functionality; and
    (c) at least one metal ester having the general formula Rm-M(OR')n, wherein M is Si, Al, Zr, Ti, Mg, B, W or Mo, and where Rm is a hydrocarbon group of less than 10 carbon atoms or a group comprising hydrogen, carbon and oxygen of less than 20 carbon atoms, R' is an alkyl or aryl group of less than 10 carbon atoms, m has values of 0, 1, 2 an 3 and correspondingly n is 4, 3, 2, or 1; and
    (d) at least one organofunctional alkoxysilane; and
    (e) a reaction product of a multifunctional polyol and a compound selected from the group consisting of an isocyanate-functional silane, a multifunctional orthosilicate, and a metal ester.

2. The coating composition of claim 1, wherein the the cycloaliphatic diepoxide is selected from the group consisting of 3,4-epoxy cyclohexylmethyl-3,4-epoxycyclohexyl carboxylate and bis-(3,4-epoxycyclohexylmethyl) adipate.

3. The coating composition of claim 1, further comprising a hydroxy-functional polymer.

4. The coating composition of claim 1, further comprising a silicone hydride functional polymer.

5. The coating composition of claim 4, wherein the silicone hydride is polyhydidomethylsiloxane.

6. The coating composition of claim 1, further comprising a compound having primary, secondary or tertiary amine functionality.

7. The coating composition of claim 1, further comprising an alpha,beta unsaturated compound.

8. The coating composition of claim 7, wherein the alpha, beta unsaturated compound is selected from the group consisting of acrylate-functional silanes, methacrylate-functional silanes, acrylic urethane, and acrylated urethane silanes.

9. The coating composition of claim 1, wherein the alkoxysilane-functional polyacrylate is represented by the formula:

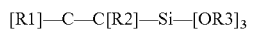

[R1]—C—C[R2]—Si—[OR3]$_3$ wherein R1 is an organic acrylic polymer, R2 is a divalent organic radical, and R3 is a monovalent radical that can include heteroatoms (e.g., oxygen, nitrogen, sulfur), including but not limited to, alkyl (linear or branched), cycloalkyl, aryl, allyl, or aralkyl, and wherein the silicon alkoxide functionality is pendant in the acrylic polymer available for further crosslinking.

10. The coating composition of claim 1, wherein the organofunctional alkoxysilane is selected from the group consisting of beta-(3,4-epoxycyclohexyl)ethyltrimethoxysilane; gamma-glycidoxypropyltrimethoxy; vinyltriethoxysilane; vinyltris (2-methoxyethoxy) silane ; gamma-methacryloxypropyltrimethoxy silane; and vinyltriacetoxy silane.

11. The coating composition of claim 1, wherein the metal ester is selected from the group consisting of tetra-isopropyl titanate; tetra-n-butyl titanate; tetra-n-butyl zirconate, tetraethyl titanate, tetraethyl zirconate, tetra 2-ethyihexyl titanate, aluminumisopropoxide, aluminum n-butoxide, aluminum-s-butoxide, orthosilicate, tetraethylorthosilicate, and tetraisopropyl zirconate.

12. The coating composition of claim 1, further comprising an alkyd, polyester, or polyamine, polyamide, polyepoxide, or a single or multi-functional hydroxyl group containing compound.

13. The coating composition of claim 1, further comprising a compound selected from a group consisting of orthosilicate or silicon alkoxide.

* * * * *

UNITED STATES PATENT AND TRADEMARK OFFICE
CERTIFICATE OF CORRECTION

PATENT NO. : 7,399,352 B2  
APPLICATION NO. : 10/741617  
DATED : July 15, 2008  
INVENTOR(S) : Jyotindra K. Doshi Page 1 of 1

It is certified that error appears in the above-identified patent and that said Letters Patent is hereby corrected as shown below:

Title Page:

Item (57) Abstract, Line 12, delete "0, 1, 2 an 3", insert --0, 1, 2 or 3--.

In the Specification:

Column 2, Line 44, Column 2, Line 66, Column 3, Line 58, and Column 11, Line 36, delete "0, 1, 2 an 3", insert --0, 1, 2 or 3--.

Column 2, Line 58, delete "at least one at least one", insert --at least one--.

In the Claims:

Column 11, Line 43, delete "the the", insert --the--.

Column 12, Line 44, delete "2-ethyihexyl", insert --2-ethylhexyl--.

Signed and Sealed this
Second Day of June, 2015

Michelle K. Lee
*Director of the United States Patent and Trademark Office*